June 8, 1937.                    J. D. PERRY                    2,082,972
                              VALVE AND THE LIKE
                              Filed July 6, 1936
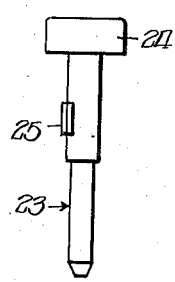
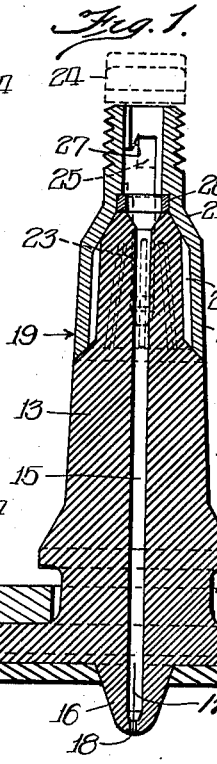
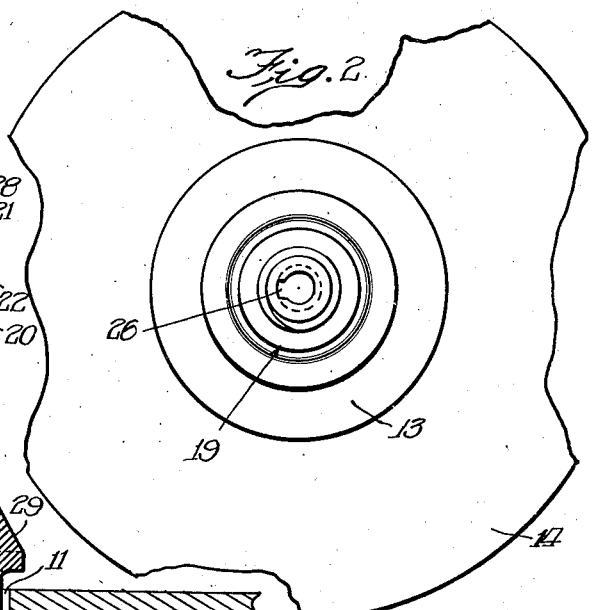
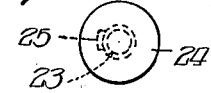
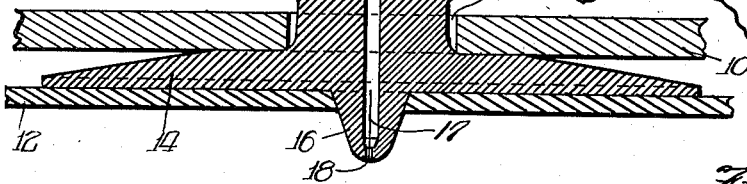
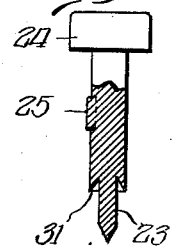
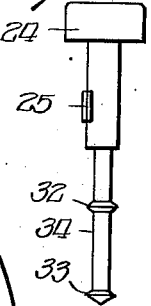
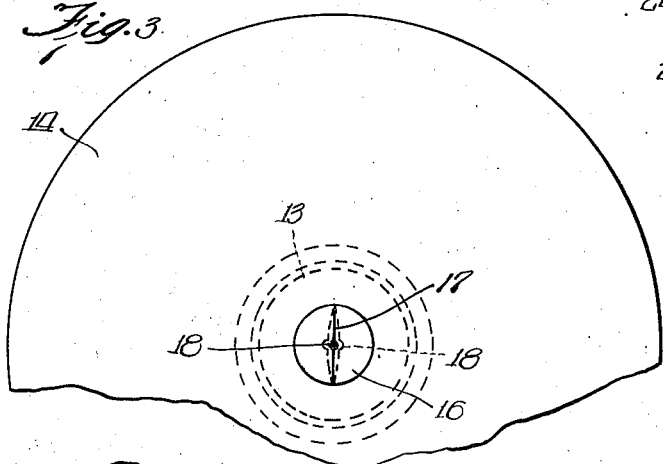
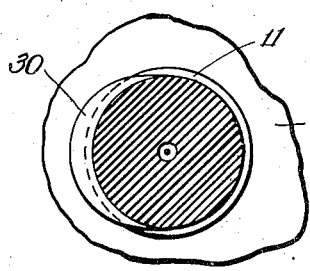

Patented June 8, 1937

2,082,972

UNITED STATES PATENT OFFICE 2,082,972

VALVE AND THE LIKE

Ira D. Perry, Muskegon, Mich.

Application July 6, 1936, Serial No. 89,136

6 Claims. (Cl. 152—12)

This invention relates to improvements in valves, and especially to improvements in valves for tires and the like. Nevertheless, it will presently appear that the features of the invention are not limited in their usefulness to tire valves, but may also be advantageously used in connection with other devices which are to be inflated. Their use for tires and the like is, however especially emphasized for reasons which will become apparent hereafter.

One object of the invention is to provide an improved air valve which is so constructed that it will afford a perfect seal, and will effectively retain the air without leakage. In this connection it is an object to provide a valve which is substantially all made of rubber or the like, thereby greatly simplifying the manufacturing operations. It is, however, sometimes desirable to provide in connection with the rubber molded part a metal tip or fixture for the end of the stem, in which case such metal part may be molded to the rubber during the molding operation.

One feature of the invention relates to the provision of a valve arrangement in which there is established a primary closure or partial seal which will effectively prevent the outrush of air when the inflating hose is removed after the inflating operation is completed, but will permit a small leakage of air to take place until the final and complete seal is effected by insertion of a final sealing plug into the end of the stem. This slight leakage past the primary closure is necessary in order to make it possible to test the pressure of the air in the tire by means of the usual air gauge, since such gauge is set and pressed against the end of the valve stem, and the air pressure must build up against the gauge when so set into place. The primary closure serves to prevent any large or abnormal outrush of air from the tire while the gauge is being set against the stem, and also prior to the time when the final and complete seal is made, thereby preventing excessive loss of pressure during these operations, but the intentional leakage or seepage of air past the primary closure permits the pressure to build up against the air gauge when set into place.

It may therefore be stated that one object of the present invention is to provide an arrangement in which there are two valves or closures in series with each other, one a primary closure, and the other a secondary closure, the primary closure being so constructed that it permits a slight or slow leakage of air, of intentional amount, and the secondary closure being so constructed that it affords a perfect seal, and effects a complete stoppage of the out leakage of air.

The secondary closure is in the form of a plug which can be inserted into the outer end of the valve stem, and which when so inserted makes a complete and perfect seal. One object of the invention is to provide an improved arrangement of such plug, and for insuring its proper retention in place until intentionally removed by the user.

Another feature of the invention relates to the provision of an improved arrangement for ensuring proper assembly of the valve stem through the wheel rim when the tire is put into place on the wheel. In this connection it is an object of the invention to provide a flange or rib on the valve stem, which is of rubber, such flange or rib being so placed that it will lock over and engage the outside face of the wheel rim when the tire is in place thereon, thereby holding the tire tube in proper engagement with the face of the wheel rim.

Other objects and uses of the invention will appear from a detailed description of the same, which consists in the features of construction and combinations of parts hereinafter described and claimed.

In the drawing:

Figure 1 shows a longitudinal section through a tire valve embodying the features of the present invention;

Figure 2 shows an outside or top face view of the tire valve and a portion of the inner tube;

Figure 3 shows an inside face view corresponding to Figures 1 and 2;

Figure 4 shows a modified form of the flange or rib which ensures proper retention of the valve and tube against the inner face of the wheel rim;

Figure 5 shows a detail view of one form of the secondary or perfect seal plug;

Figure 6 shows a top view of the plug of Figure 5;

Figure 7 shows a view of a modified form of the plug, partially in section; and

Figure 8 shows a view of another modified form of the plug.

Referring first to Figures 1, 2, and 3, the wheel rim is designated by the numeral 10. It is provided with the valve stem hole 11 in the usual manner. The inner tube is designated by the numeral 12.

The tire valve includes the rubber stem 13, the inner end of which is provided with the flange or disk 14 for attachment to the tube 12 by cementing or otherwise. Sometimes the valve stem 13 will be formed integrally with the inner tube, in which case the flange or disk 14 will be in effect merged with the material of the tube.

There is a longitudinally extending passage 15 through the valve stem. The inner end of this passage terminates at the position of the primary closure now to be described. This primary closure in the form illustrated comprises the boss or inwardly extending enlargement 16 of the disk 14, which boss extends through a hole of the inner tube. There is a cross cut or slit 17 through this boss, so that during inflation or otherwise the two halves of the boss may be forced apart to thereby allow the inner end of the passage 15 to communicate with a full opening with the inner tube. Conversely, under normal conditions the two portions of the boss come together as shown in Figures 1 and 3, so that, as far as the cross cut is concerned, there is provided a seal against outflow of air from the inner tube. It will be noted, however, that in such case it would be impossible to build up a pressure within the passage for operation of a tire pressure gauge set against the outer end of the valve stem, so that the user would be prevented from testing his tire pressure.

In order to make possible the building up of the pressure within the passage 15, I have provided an arrangement such that there is always a slight and known leakage through the primary closure. For this purpose I have, in the arrangement shown in these figures, provided a small hole or perforation 18 in the boss 16, and at the position of the cross cut or slit, which small perforation is so small that it will prevent outrush of air from the inflated tube, but nevertheless will permit such a seepage or leakage as will make possible the proper operation of the tire test gauge. It will be noted that this small opening may be easily formed by a proper needle or the like during the rubber moulding operation, and thus the size and leaking ability of this hole will be accurately known and determined. In other words, there is provided a primary closure which normally closes to provide a primary seal, but which closure is formed that when so closed it nevertheless permits a slight and known amount of leakage to take place.

In order to effect a final and complete closure of the passage 15 I have provided a plug or secondary seal therefor, which may be readily inserted into or removed from the outer end of such passage. Such plug or secondary seal may be of many selected forms, but reference to Figures 1, 2, 5, 6, 7 and 8 will illustrate typical forms thereof. Preferably there is a metal fixture set or moulded over the outer end of the valve stem during the rubber moulding operations. This is shown in Figure 1 at 19. It may be a die casting having the flange 20 which sets down over and protects the outside face of the outer end of the valve stem, being contracted at the position 21 where it reaches past the end of the valve stem. The extreme end portion of this metal fixture is exteriorly threaded to receive any attachment which it may be desired to attach thereto. Also, there may be provided a series of small lugs or ribs 22 on the inside face of the metal fixture to ensure more complete and better adherence of the rubber to the fixture during the moulding operation.

The rubber stem reaches up within the fixture to the position of the contraction 21, and the diameter of the end portion of the fixture is greater than that of the passage 15, so that the rubber of the stem flares outwardly somewhat as shown in Figure 1 at the position of the contraction of the metal fixture. Thus, when looking down into the outer end of the passage there is seen a rubber shoulder at the outer end of the passage 15.

The secondary seal is in the form of a plug, such as shown in Figures 5 and 6. This is the plug 23. It is a metal stem, the inner or lower end of which is of size such that it can be forced into the passage 15, and the outer or upper portion of the plug is provided with the head 24 by which it can be easily manipulated. When the plug is forced down into the passage it serves to effectively seal the passage, and absolutely prevent any outleakage of air therefrom.

In order to prevent the plug from being forced out by the air pressure within the tire, and also to prevent the plug from being worked off by vibration, etc., I have provided a bayonet coupling between the plug and the fixture 19. This includes the small lug 25 on the side of the plug which may be set past the notch 26 in the outer end of the fixture, to a position where the plug is fully inserted into the passage, and then the plug may be given a quarter turn to bring the lug 25 beneath a shoulder 27 in the outer end of the fixture, so that then the plug cannot be moved directly off from the valve stem. Preferably also this shoulder returns outwardly somewhat so that the plug cannot be turned back to the disengaging position without also slightly moving the plug outwards. In order to facilitate the manufacturing operations, I have shown a small ring insert in the metal fixture at the position of the contraction 21, so as to properly define and protect the upper end of the rubber stem during the moulding operations.

In order to hold the stem in proper position on the wheel rim, I prefer to provide a rib or flange 29 on the stem in position to overlap the wheel rim when the tire is in place thereon. This rib may be continuous around the valve stem, as shown in Figures 1, 2 and 3, or may be discontinuous or fragmentary, as shown in Figure 4 at 30. In either case, when the tire is in place on the wheel rim the rib serves to prevent removal of the tire therefrom, except by an intentional operation of the user.

In the form of Figure 7 the secondary sealing plug is provided with a sharp edge 31 which will engage the end portion of the rubber valve stem when the plug is set into place in the metal fixture, so that a perfect seal is effected between the plug and the end portion of the rubber valve stem.

In the form of Figure 8 the plug is provided with a pair of sharp ribs or projections 32 and 33 which will slightly penetrate the material of the rubber valve stem when the plug is set and forced into place, to thereby effect the seal. In this case the body of the plug 34 may be made of slightly larger size than the passage, but reliance will be placed on the ribs 32 and 33 for the perfect sealing action.

It is to be noted that the plugs may be of metal or any other hard material, but when made of metal they may be conveniently formed by automatic screw machine operations.

This application, as to certain features herein disclosed, is an improvement of my previously filed application, Serial No. 4,638, for Air valves and the like, filed February 2, 1935.

I claim:

1. As a new article of manufacture, a tire valve for pneumatic tires, comprising a rubber valve stem having a longitudinally extending air passage therethrough, said air passage terminating short of the inner end of the device, an inwardly extending boss at the inner end of the stem, and in line with the passage, there being a relatively small port in the boss in line with the passage through which contained air from the tire may flow at a predetermined rate, there being a cross cut in the boss at the position of said port providing normally contacting port enlarging portions of the boss adapted to separate from each other during inflation, means for normally sealing the outer end of the passageway in said valve stem against flow of air through said port.

2. As a new article of manufacture, a tire valve for pneumatic tires, comprising a rubber valve stem having a longitudinally extending air passage therethrough, said air passage terminating at the position of a primary closure at the inner end of said passage, said primary closure including a relatively small port in communication with the passage through which air may flow through the passage from the inner end of the same, means for enlarging said port upon the application of air pressure against said primary closure in one direction only, and means frictionally engaged within the outer end portion of the passage to seal same against leakage of air through said port.

3. As a new article of manufacture, a tire valve for pneumatic tires, comprising a rubber valve stem having a longitudinally extending air passage therethrough, said air passage terminating at the position of a primary closure at the inner end of the tire valve, said primary closure including a wall having a relatively small port therein through which air flow at predetermined rate to said passageway is maintained, whereby testing of tire pressure with usual gauge placed against the outer end of the valve stem and without material loss in tire pressure is obtained, and removable means frictionally engaged within the outer end portion of the passage to seal the same against flow of air through said port.

4. As a new article of manufacture, a tire valve for pneumatic tires, comprising a rubber valve stem having a longitudinally extending air passage therethrough, said air passage terminating at the position of a primary closure adjacent the inner end of the passage, said primary closure including normally engaging separable valve portions arranged to open during inflow of air into the tire during inflation, means associated with said valve portions providing a relatively small tire gauging port in constant communication with the interior of said passageway and tire, and removable means engaged within the outer end portion of said passageway and sealing the same against flow of air through said port.

5. As a new article of manufacture, a tire valve for pneumatic tires, comprising a rubber valve stem having an air passage therethrough and suitable valve arrangements in connection therewith, a tubular metal fixture moulded to the outer end portion of said valve stem and including a bayonet connector, together with a plug having a portion of larger diameter than said passage adapted for insertion into the outer end portion of the passage for frictional engagement with the rubber wall thereof as a base of resistance, said plug having a bayonet coupling adapted to engage with the bayonet connector of the metal fixture and adapted to be held in locking engagement therewith by the cooperative relationship of said plug and resilient wall of said passageway in sealing said passageway against outflow of air therethrough.

6. As a new article of manufacture, a tire valve for pneumatic tires, comprising a rubber valve stem having a longitudinally extending air passageway therethrough, said air passageway terminating at the position of a primary closure adjacent the inner end of said passageway, said primary closure including normally engaging separable valve portions arranged to open during inflow of air into the tire during inflation only, means associated with said valve portions providing a relatively small tire gauging port in constant communication with the interior of said passageway and tire, a tubular metal fitting secured to the outer end portion of said valve stem and including a bayonet connector, a passageway sealing plug having a portion of larger diameter than the passageway adapted for insertion through said metal fixture into the outer end portion of the passageway for frictional engagement with the rubber wall thereof, and said plug having a bayonet coupling adapted to engage with the bayonet connector of the metal fixture and adapted to be held in locking engagement therewith under the resilient action of the rubber wall of said passageway in sealing said passageway against the outflow of air through said port.

IRA D. PERRY.